United States Patent [19]

Wolf

[11] Patent Number: 4,935,038
[45] Date of Patent: Jun. 19, 1990

[54] PROCESS FOR RECOVERY OF USABLE GAS FROM GARBAGE

[75] Inventor: Bernd M. Wolf, Aalen, Fed. Rep. of Germany

[73] Assignee: PKA Pyrolyse Kraftanlagen GmbH, Fed. Rep. of Germany

[21] Appl. No.: 307,815

[22] Filed: Feb. 7, 1989

Related U.S. Application Data

[63] Continuation-in-part of Ser. No. 38,051, Apr. 14, 1987, abandoned.

[30] Foreign Application Priority Data

Aug. 16, 1985 [DE] Fed. Rep. of Germany ....... 3529445

[51] Int. Cl.⁵ .............................. C10J 3/66; C07C 9/04
[52] U.S. Cl. ....................................... 48/209; 201/2.5; 201/6; 201/25; 48/197 R
[58] Field of Search .................. 48/197 A, 197 R, 209; 201/2.5, 6, 25, 12; 585/240–242, 733; 435/167; 210/603, 609, 613

[56] References Cited

U.S. PATENT DOCUMENTS

| 3,236,604 | 2/1966 | Pierson | 48/209 |
| 3,579,320 | 5/1971 | Pesses | 48/209 |
| 3,736,111 | 5/1973 | Gardner et al. | 48/209 |
| 4,022,665 | 5/1977 | Ghosh et al. | 435/167 |
| 4,028,068 | 6/1977 | Kiener | 48/209 |
| 4,289,625 | 9/1981 | Tarman et al. | 210/603 |
| 4,557,204 | 12/1985 | Faehnle | 110/346 |

Primary Examiner—Joye L. Woodard
Attorney, Agent, or Firm—Welsh & Katz, Ltd.

[57] ABSTRACT

In a process for the recovery of usuable gas from garbage by pyrolysis, the garbage is sorted into a heavy wet vegetable portion and a light dry portion. The light portion is pressed into pellets or granules having characteristics dimensions in a range of 1–50 mm that are dried to a maximum moisture of approximately 25 wt. %, and then are passed to a pyrolysis reactor in which partially burned gas is generated and separated from noncombustible residues. The partially burned gas is taken to a high temperature gas converter where it is converted to fuel gas over a glowing carbonaceous bed. The heavy vegetable fraction of the garbage is taken to a biomass converter in which it is used to generate methane gas.

20 Claims, 1 Drawing Sheet

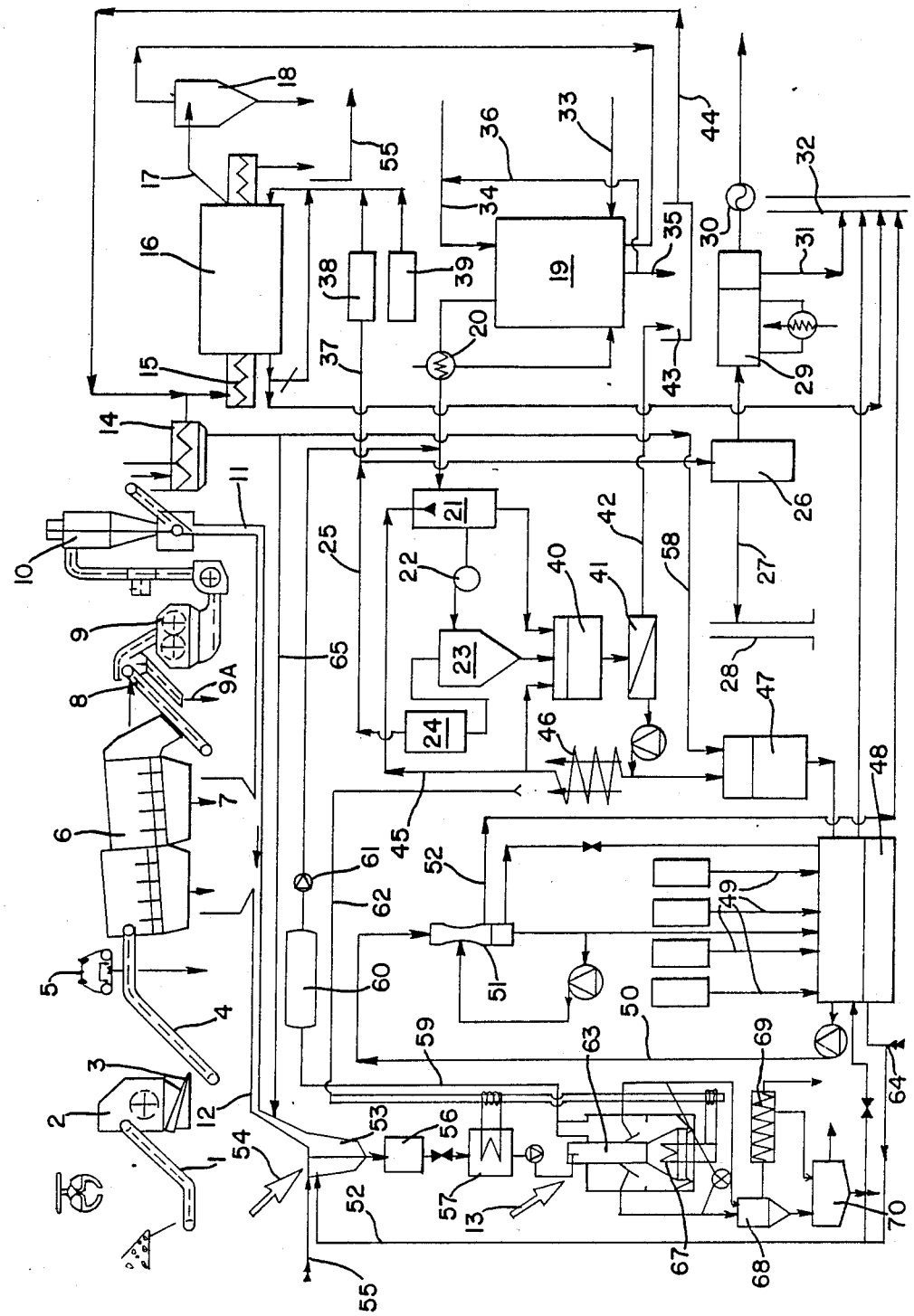

PROCESS FOR RECOVERY OF USABLE GAS FROM GARBAGE

CROSS REFERENCE TO RELATED APPLICATION

This application is a continuation-in-part application of a prior application entitled "Process for Recovery of Usable Gas From Garbage", Serial No. 038,051, filed on Apr. 14, 1987.

BACKGROUND OF THE INVENTION

This invention relates to a process for recovering usable gas from refuse or garbage. In particular, it relates to an improved process for recovering usable fuel gas from refuse or garbage by pyrolysis.

In methods of processing refuse or garbage, the garbage is pressed into pellets or granules that are dehydrated and placed in a heated reactor in which gas is evolved by pyrolysis. Some of the gas is burned to maintain heat in the reactor, and the rest is separated from residual substances such as ash and other noncombustibles. The unburned gas is then piped to a gas converter where it is mixed with air over a glowing coal bed and converted to water gas. A method of and means for performing such a process is described in German Patent Specification DE-OS 33 47 554, which is U.S. Pat. No. 4,557,204. Both of these patents are assigned to the assignee of the present invention.

The process of the subject invention produces usable gas from garbage without generating noxious byproducts except for a relatively high percentage of ammonia in the waste water. The process is also self-sustaining in that it operates on less than half of the available energy of the constituents of the garbage.

The gas thus produced can be used to drive gas turbines and gas engines. Pyrolysis is performed in a deficiency of oxygen in a temperature range under 600° C. to prevent dispersion and subsequent oxidation of the heavy metals present in the garbage. This minimizes the probability of release of heavy metals to the environment, which may be hazardous to people. However, pyrolysis in this temperature range leaves a residue with a relatively high carbon component, which is not available to produce energy in the pyrolysis apparatus. Depending upon the amount of vegetable matter in the refuse and the preseparation of inert materials, the amount of carbon in the pyrolysis residue can be more than 40%.

Since about 5% by weight of household garbage is soluble in water and, therefore, can be treated by microbes to change the carbon-amount into gaseous methane, it has been proposed in U.S. Pat. No. 4,289,625 to treat organic refuse first in a biogas generation zone, and then to thermally treat the residue for additional gas generation. This method has been proposed due to the fact that biogas, which has been recovered by the anaerobic treating of the water-soluble organic dry-substance of the garbage, has more heating energy than pyrolysis gas, i.e. about 23 MJ/Nm$^3$ compared to about 6 MJ/Nm$^3$. (The term "Nm$^3$" means cubic meter normal: 1013 millibar, 0° Celsius.)

However, such a method does not allow optimal specific treating of the different components and materials from the garbage.

Since household garbage has about 30% by weight organic dry-material, of which only about 17% by weight can be treated anaerobically and in addition contains about 33% by weight inert dry material, such a method also has the disadvantage that a lot of solid residue must be transported through the whole apparatus for a very long time. This means that all parts of the apparatus, including all energy suppliers (heating apparatus, for example, for heating from 33-37° C. up to pyrolysis temperature), have to be dimensioned very large, which makes the whole method and apparatus uneconomical.

A further disadvantage is that in the acid phases of the anaerobic treating, components and materials containing heavy-weight metals (for example, of the group of cellulosic-metal, hemicellulosic-metal and lignin-metal treating products) will be brought into solution and give problems with pollution. Disadvantageous is also the fact that the high amount of non-biodegradable organic materials reduces the speed of reproduction of the micro-organisms and, therefore, the treating process requires a longer time and, therefore, it is further necessary to provide larger dimensions for all apparatus.

BRIEF SUMMARY OF THE INVENTION

It is an object of the present invention to provide a better method of treating garbage to produce usable gas.

It is a further object of the present invention to provide improved energy recovery from the use of garbage as an input to a low-temperature pyrolysis process.

It is a further object of the present invention to provide a better method of treating garbage by low-temperature pyrolysis while minimizing the amount of ammonia in the waste water.

Other objects will become apparent in the course of a detailed description of the invention.

An improved method of treating garbage comprises separating the garbage into a heavier moist portion comprising largely vegetable residue and a lighter weight, drier portion. The heavier wet vegetable portion contains water soluble materials which can be treated with microbes. These water soluble materials are water soluble organic compounds which are derived from animal and vegetable components in the garbage. Although these water soluble organic biodegradable compounds are not derived exclusively from vegetable matter, they are referred to as the "wet vegetable" fraction or portion of the garbage. The lighter dry portion contains water insoluble organic compounds which are derived from animal and vegetable matter in the garbage, plus inorganic materials from the garbage, such as glass and metal components. The lighter dry portion is pressed into briquettes, pellets or granules of 1-50 mm in size. These shapes are subjected to low temperature pyrolysis to produce usable fuel gas. The moist vegetable portion is fed to a biogas installation to produce methane gas. The process of separation increases the recovery of energy over that recoverable by treating the garbage as a whole. The lighter dry fraction can be treated conventionally by low-temperature pyrolysis. The relative absence of water in the granules that are taken to the pyrolysis reactor increases the heating value of the gas produced by pyrolysis.

The heavier wet vegetable fraction generally contains part of the heavy metals in the garbage and is, therefore, not suitable for composting. Instead, it is treated bacteriologically in a multi-stage fermenter to produce methane gas, which can also be used to drive a gas turbine or a gas engine.

While the principle of recovering methane gas from organic substances by a biogas installation is known, it has not been economical to practice it on a commercial scale. However, the combination of low temperature pyrolysis on the lighter drier fraction of the garbage with such a biogas process on the heavy wet vegetable fraction of the garbage leads to a commercially feasible installation. The water in the garbage is turned into water gas in the gas converter, while heavy metal constituents in the garbage are removed in the waste water from the reaction. The low temperature pyrolysis reaction produces heat while the biogas installation is driven by heat so that use of heat from the pyrolysis reaction contributes to the overall efficiency of the process. Thus, for example, the organic residue in the ash from the pyrolysis reaction can be taken to the biogas installation. In addition to the saving in heat that this represents, the carbon in the residue from the pyrolysis reaction can be converted to methane gas in the biogas installation. There are several possible ways to operate the biogas process. These include phase-separated means producing acetic acid and methane.

Another advantage of the process of the present invention is obtained when forming pellets or granules from the lightweight fraction of the garbage. The water evolved from drying the material can be mixed into the hydrolysis stage to leach out organic material from the light fraction. This is readily combined with use of the vapor thus obtained to preheat the input material to the biogas installation. This also binds the active compounds of ammonia in the condensate from the drying process so that the quantity of ammonium compounds in the waste water is reduced. These ammonium compounds are undesirable in the residue because they tend to attack concrete.

In an alternate embodiment of the invention, the wash-water concentrate resulting from the washing, filtering and cooling of the gas produced by the pyrolysis process is taken to the biogas installation. In this case, the organic components of the wash-water concentrate provide organic matter for the formation of methane gas by bacterial action. The wash-water concentrate contains phenols and other organic substances that can be used to supply heat for the biogas installation. In addition, the sludge-like wash-water concentrate contains bacteria which contribute to the formation of methane gas in the biogas installation. It is also possible to use the residues of the treatment process as inputs to cupola furnaces or the like to recover metals. The residue has a high content of unoxidized heavy metals and compounds of heavy metals and also minerals or inert substances which can be used as cast metals or in steel refining. This prevents contamination of the environment by dispersal of heavy metals and their compounds. Sludge from outside sources can also be treated in the biogas installation, as well as sludge from the biogas installation.

The process of the present invention can yield more than 850 cubic meters of gas with a heating value of more than 4,250 MJ from one ton of residential garbage. Only 250 kg per ton of inert or not fully decomposed residue remains. The residue is biologically stable, which means that under normal conditions it is not subject to further decomposition. These inert residues are suitable for disposal in a dump, or they can be subjected to further treatment to recover heavy metals. Only about 250 liters per ton of household garbage remains to be taken to storage or to a settling basin.

The residual substances from the pyrolysis process are subject to relatively low losses in transport and this is also true of the wash water concentrate from the pyrolysis installation. As a result, it is not necessary that the biogas installation be located at the pyrolysis site. Though a biogas installation may be set up at a garbage-sorting and granulating plant to supply energy for the process, and the granules may be transported elsewhere to a reactor for pyrolysis.

Pyrolysis installations are preferably located where heat is needed. If this is at a location remote from the biogas installation, vehicles delivering pellets and granules to the pyrolysis unit can return pyrolysis residues and water by-products to the granulating apparatus and to the biogas installation for use.

BRIEF DESCRIPTION OF THE DRAWING

The drawing is a flow diagram of an apparatus for the practice of the present invention.

DETAILED DESCRIPTION OF THE PREFERRED EMBODIMENT

Garbage to be processed arrives at a conveyor belt 1, which conveys it to a preliminary breaker 2 for coarse breakup. Preliminary breaker 2 may be a hammer mill or the like. The processed garbage is taken on a conveyor chute 3 to a conveyor 4 which passes it under a magnetic separator 5 to remove magnetic material. It is then passed to a sorter 6, a comb-roller separator or the like with rotating rollers, in which the heavier wet fraction of vegetable material falls into a container 7 below. The lighter-weight portion of the garbage passes through sorter 6 to a conveyor belt 8 and then to a breaker 9. A second cut of heavy matter is taken off in the direction of an arrow 9a, and the light matter is taken to a pneumatic separator 10, which further separates heavy fractions into a line 11 and thence to container 7, thence through a feedline 12 to feed hopper 53 of a biogas installation 13.

From pneumatic separator 10, the light fraction passes into a press 14, in which the light fraction is pressed at a temperature of the order of 110–150° C. into pellets or granules having dimensions in a range of 1 to 50 millimeters. The heated press 14 is described in German Patent Specification DE-OS 33 47 554 (U.S. Pat. No. 4,557,204). Pellets and granules, which now have a moisture content not greater than about 25 wt.%, pass through a feeder valve 15 into a pyrolysis reactor 16, in which partially burned gas is generated at reaction temperatures in the range of 450–600° C.

Unburned pyrolysis gas product, which contains uncombusted organic components, is fed over a discharge line 17 through a dust separator 18 to a high temperature gas converter 19, wherein the conversion process may include partial combustion to heat the gas to a cracking temperature in the range of from about 1100° to about 1200° C. During cracking, the long chain hydrocarbons are converted to methane and hydrogen, and other simple hydrocarbons. Simultaneously, there is achieved a partial separation of the water, contained in the vapor phase in the gas mixture, into hydrogen and oxygen. During disassociation, the gases are passed through a glowing hot carbonaceous bed of coal or coke in which the further reactions occur. As may be required, additional water may be introduced into the reaction zone with the pyrolysis gas stream. A gas converter of this type is described in German Patent Specification DE-OS 33 17 977.

The resulting fuel gas passes through a heat exchanger 20, a water spray tower 21, a blower 22, a centrifugal separator 23, a drop separator 24 and a gas line 25 to a gas-holder or gasometer 26. The gasometer 26 may be required to compensate for fluctuations in the flow rate of gas. If the gas flow is excessive, the excess gas can be fed over a shunt line 27 to a flare burner 28. From the gasometer 26, the gas passes to a gas motor 29, which is connected mechanically to a generator 30. Burned waste gases are conducted through a waste-gas line 31 into a vent stack 32.

The gas converter 19 receives water through a line 33, to the extent that water addition is desired, and coke or coal through a feed line 34. Ashes are discharged through an ash discharge line 35. A coke return line 36 allows reuse of coke to save energy. A shunt line 37 branches from gas line 25 and by this means a portion of the produced fuel gas is taken to a gas burner 38, which heats the pyrolysis reactor 16. An oil burner 39 preheats the reactor 16 during start-up. When the operation has reached its steady state, all of the heat needed for the reactor 16 can be obtained from gas burner 38.

Water produced from wash tower 21 and separator 23 in the gas purification process is taken to a wash-water tank 40, and then into a filter 41. Solids that are separated in the filter 41 are taken through a line 42 into an ash container 43, which also receives ashes via line 35 from gas converter 19. Residual substances from ash container 43 are taken over a discharge line 44 and through an entry system, such as a feeder valve 15, into pyrolysis reactor 16. Recycling of the residual substances in this fashion has the advantage that polycyclic aromatic hydrocarbons are processed to form compounds of lower molecular weight in the gas converter. This includes compounds such as fluoranthene, pyrene, benzo-alpha-anthracene and chrysene, all of which may be formed in the process of partial combustion in the gas converter and are generally bound to the solid particles that are eventually removed at filter 41. The remaining solids are removed from the circulation of the pyrolysis process by a line 55. As a result, the residual solids from both thermal reaction processes are concentrated at a single location.

The purified wash water passes from filter 41 through a cooling tower 46, and then through a line 45 back into spray tower 21. Part of the purified water from filter 41 is taken to a wash-water neutralization installation 47, which also receives expelled fluids from press 14 via line 58. This is an overflow from the main feed in a line 65, which is taken to a preliminary container 53 of the biogas installation. Wash water passes from wash-water neutralization installation 47 into a circulation water treatment installation 48, where it is purified chemically. Treatment chemicals for this process include sodium hydroxide, hydrogen peroxide, sulfuric acid, and the like. Wash water from treatment installation 48 is taken through a line 50 through an air filter 51 to remove foam and separate out waste gases that are taken through a line 52 to stack 32.

Water that has been purified both chemically and mechanically passes from the treatment installation 48 over line 52 into feed hopper 53, which holds the input to the biogas installation. Hopper 53 also receives the wet vegetable substances over line 12, as well as settling sludge, raw compost, or the like, as indicated by an arrow 54. Residual matter from the pyrolysis process, which is relatively high in carbon content, passes from reactor 16 through a line 55 to hopper 53. The carbon content of the residual matter from the pyrolysis reactor 16 can be more than 30%.

Water from press 14 is taken to feed hopper 53 either directly by line 65 or after passage through water treatment unit 48 and line 52. This water contains phenols and other hydrocarbons that can be processed biologically. This water also has a relatively high component of ammonium ions and can therefore be processed in the biogas installation 13.

The various materials that have been placed in hopper 53 are next taken to a hydrolysis stage 56, and then to a large volume counterflow heat exchanger 57 which is heated by a flow in a line 62 from cooling tower 46. This heats the working substance to 22° C., which is an appropriate temperature for material entering the biogas installation 13 to start the fermentation process. The material then drops to a decomposition zone 67, where it is heated by line 62, raising the temperature of the material to the range of 33° to 37° C. This represents use of heat from the pyrolysis installation in the biogas installation. Some of that heat is also recovered through the elevated temperature of water supplied over line 52. This is an advantage over conventional biogas installations in which as much as 50% of the energy in the gas produced is used to operate the biogas system in winter.

Biogas installation 13 is conventional in construction. It may be a phase-separated installation in which a middle region 63 has a normal acid phase near the top and an acetic acid phase near the bottom. Methane gas is generated near the surface of middle section 63. The methane gas is substantially free of oxygen since the oxygen decomposition takes place in the upper acid zone of middle section 63. Methane gas escapes from the bottom of the middle section 63 and flows over a gas line 59 through a buffer 60 and a compressor 61 to gas line 25, either directly or through the water spray tower 21 and associated equipment, if it is necessary to remove hydrogen sulfide or the like. Alternatively, the methane gas stream may be discharged by compressor 61 as a separate product stream which is not combined with the fuel gas product stream in line 25.

Residue from biogas installation 13 is discharged with about 96% moisture content through floating suction lines 66, through which it is fed to a preliminary dewatering system 68. There it is reduced to a moisture content of about 80%. Solids in the material in dewatering system 68 are taken to a drying press 69 where they are reduced to about 15% humidity. Water extracted in dewatering apparatus 68 and drying press 69 is taken to a storage tank 70, where it may be drained to the sewer or returned to water treatment installation 48.

While the present invention is susceptible of embodiment in many different forms, there is shown in the drawing and described in the detailed description a specific embodiment, with the understanding that the invention is not limited thereto except insofar as those who have the disclosure before them are able to make modifications and variations therein without departing from the scope of the invention.

I claim:

1. A method for the recovery of usable gas from garbage containing water soluble organic compounds, water insoluble organic compounds, and inorganic compounds, which comprises the steps of:

a. separating garbage into a wet vegetable fraction containing water soluble organic compounds and a light dry fraction containing inorganic compounds and water insoluble organic compounds;

b. passing said wet vegetable fraction to a biogas generation zone maintained under conditions sufficient to form a product gas stream comprising methane;

c. passing said light dry fraction into a pelletizing zone maintained under conditions sufficient to form said light dry fraction into pellets having a moisture content not greater than about 25 wt.%;

d. passing said pellets into a pyrolysis reaction zone maintained under conditions of temperature and oxygen deficiency sufficient to produce a pyrolysis gas containing uncombusted organic compounds and a pyrolysis residual ash containing an organic residue;

e. passing said pyrolysis residual ash to said biogas generation zone;

f. passing said pyrolysis gas into a high temperature reaction zone comprising a hot carbonaceous bed under conditions sufficient to generate a fuel gas product stream and a high temperature reaction ash containing an organic residue;

g. passing said high temperature reaction ash to said pyrolysis reaction zone; and, h. recovering said methane product gas stream and said fuel gas product stream.

2. A method according to claim 1 wherein said conditions in said pelletizing zone include a temperature of from about 110° C. to about 150° C.

3. A method according to claim 1 wherein said conditions in said pyrolysis reaction zone include a temperature of from about 450° C. to about 600° C.

4. A method according to claim 1 wherein said conditions in said high temperature reaction zone include a temperature of from about 1100° C. to about 1200° C.

5. A method according to claim 1 wherein said conditions in said high temperature reaction zone include reacting said pyrolysis gas in said hot carbonaceous bed in the presence of added water.

6. A method according to claim 1 wherein said methane product gas stream and said fuel gas product stream are recovered as a combined product stream.

7. A method according to claim 1 wherein at least a portion of a combustible gas stream selected from the group consisting of said methane product stream, said fuel gas product stream, and a mixture said two gas product streams, is consumed in a combustion zone to generate heat sufficient to maintain said pyrolysis reaction zone at the pyrolysis reaction temperature.

8. A method according to claim 1 wherein a portion of thermal energy contained in said fuel gas product stream as it exits from said high temperature reaction zone is utilized to maintain temperatures within said biogas generation zone at levels sufficient to generate said methane product gas stream.

9. A method according to claim 1 wherein said pelletizing zone produces a liquid containing organic compounds as said pellets are formed, and said liquid is passed into said biogas generation zone.

10. A method according to claim 1 wherein said pellets are from about 1 to about 50 mm. in size.

11. A method for the recovery of usable gas from garbage containing water soluble organic compounds, water insoluble organic compounds, and inorganic compounds, which comprises the steps of:

a. separating garbage into a wet vegetable fraction containing water soluble organic compounds and a light dry fraction containing inorganic compounds and water insoluble organic compounds;

b. passing said wet vegetable fraction to a biogas generation zone maintained under conditions sufficient to form a product gas stream comprising methane;

c. passing said light dry fraction into a pelletizing zone maintained under conditions sufficient to form said light dry fraction into pellets having a moisture content not greater than about 25 wt.%;

d. passing said pellets into a pyrolysis reaction zone maintained under conditions of temperature and oxygen deficiency sufficient to produce a pyrolysis gas containing uncombusted organic compounds and a pyrolysis residual ash containing an organic residue;

e. passing said pyrolysis gas into a high temperature reaction zone comprising a hot carbonaceous bed under conditions sufficient to generate a fuel gas product stream and a high temperature reaction ash containing an organic residue;

f. passing said high temperature reaction ash to said pyrolysis reaction zone; and, g. recovering said methane product gas stream and said fuel gas product stream.

12. A method according to claim 11 wherein said conditions in said pelletizing zone include a temperature of from about 110° C. to about 150° C.

13. A method according to claim 1 wherein said conditions in said pyrolysis reaction zone include a temperature of from about 450° C. to about 600° C.

14. A method according to claim 11 wherein said conditions in said high temperature reaction zone include a temperature of from about 1100° C. to about 1200° C.

15. A method according to claim 11 wherein said conditions in said high temperature reaction zone include reacting said pyrolysis gas in said hot carbonaceous bed in the presence of added water.

16. A method according to claim 11 wherein said methane product gas stream and said fuel gas product stream are recovered as a combined product stream.

17. A method according to claim 11 wherein at least a portion of a combustible gas stream selected from the group consisting of said methane product stream, said fuel gas product stream, and a mixture said two gas product streams, is consumed in a combustion zone to generate heat sufficient to maintain said pyrolysis reaction zone at the pyrolysis reaction temperature.

18. A method according to claim 11 wherein a portion of thermal energy contained in said fuel gas product stream as it exits from said high temperature reaction zone is utilized to maintain temperatures within said biogas generation zone at levels sufficient to generate said methane product gas stream.

19. A method according to claim 11 wherein said pelletizing zone produces a liquid containing organic compounds as said pellets are formed, and said liquid is passed into said biogas generation zone.

20. A method according to claim 11 wherein said pellets are from about 1 to about 50 mm. in size.

* * * * *